US012692792B2

(12) United States Patent
Osgood et al.

(10) Patent No.: US 12,692,792 B2
(45) Date of Patent: Jul. 28, 2026

(54) GAS TURBINE ENGINES AND METHODS ASSOCIATED THEREWITH

(71) Applicant: GENERAL ELECTRIC COMPANY, Schenectady, NY (US)

(72) Inventors: Daniel Endecott Osgood, Loveland, OH (US); Gregory Terrence Garay, West Chester, OH (US); Ryan Christopher Jones, Cincinnati, OH (US); Tingfan Pang, West Chester, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/432,818

(22) Filed: Feb. 5, 2024

(65) Prior Publication Data

US 2024/0175364 A1 May 30, 2024

Related U.S. Application Data

(63) Continuation of application No. 18/104,371, filed on Feb. 1, 2023, now abandoned, which is a continuation (Continued)

(51) Int. Cl.
*F01D 5/14* (2006.01)
*F01D 25/12* (2006.01)
(Continued)

(52) U.S. Cl.
CPC ............ *F01D 5/147* (2013.01); *F01D 25/12* (2013.01); *F01D 25/14* (2013.01); *F23C 7/02* (2013.01);
(Continued)

(58) Field of Classification Search
CPC .......... F01D 5/147; F01D 25/12; F01D 25/14; F01D 5/186; F01D 5/288; F23C 7/02;
(Continued)

(56) References Cited

U.S. PATENT DOCUMENTS 4,347,037 A 8/1982 Corrigan
4,762,464 A 8/1988 Vertz et al.
(Continued)

FOREIGN PATENT DOCUMENTS

CN 107201920 A1 9/2017
EP 1387040 A1 4/2004

*Primary Examiner* — Courtney D Heinle
*Assistant Examiner* — Andrew Thanh Bui
(74) *Attorney, Agent, or Firm* — Hanley, Flight & Zimmerman, LLC

(57) ABSTRACT

A method of forming a gas turbine engine component, the method including forming a plurality of cooling apertures in a preform structure of the component, the plurality of cooling apertures of the preform structure comprising a first cooling aperture and a second cooling aperture, wherein cross-sectional shapes of the first and second cooling apertures of the preform structure are different from one another, as measured in a same relative plane; and applying a coating to at least a portion of the preform structure to form the component, wherein a cross-sectional shape of the first and second cooling apertures of the component are approximately the same as one another, as measured in the same relative plane.

20 Claims, 8 Drawing Sheets

Related U.S. Application Data of application No. 16/987,872, filed on Aug. 7, 2020, now Pat. No. 11,585,224.

(51) Int. Cl.
*F01D 25/14* (2006.01)
*F23C 7/02* (2006.01)

(52) U.S. Cl.
CPC ...... *F05D 2300/60* (2013.01); *F05D 2300/70* (2013.01)

(58) Field of Classification Search
CPC ............. F05D 2300/60; F05D 2300/70; F05D 2260/202; F05D 2230/90
See application file for complete search history.

(56) References Cited

U.S. PATENT DOCUMENTS

| | | | | |
|---|---|---|---|---|
| 4,827,587 | A | 5/1989 | Hall et al. | |
| 4,859,147 | A | 8/1989 | Hall et al. | |
| 5,246,340 | A | 9/1993 | Winstanley et al. | |
| 5,370,499 | A | 12/1994 | Lee | |
| 5,392,515 | A | 2/1995 | Auxier et al. | |
| 5,405,242 | A | 4/1995 | Auxier et al. | |
| 5,458,461 | A | 10/1995 | Lee et al. | |
| 5,660,524 | A | 8/1997 | Lee et al. | |
| 5,771,577 | A | 6/1998 | Gupta et al. | |
| 5,941,686 | A | 8/1999 | Gupta et al. | |
| 6,050,777 | A | 4/2000 | Tabbita et al. | |
| 6,099,251 | A | 8/2000 | LaFleur | |
| 6,210,488 | B1 | 4/2001 | Bruce | |
| 6,243,948 | B1 | 6/2001 | Lee et al. | |
| 6,333,069 | B1 | 12/2001 | Beech | |
| 6,339,879 | B1 | 1/2002 | Wheat et al. | |
| 6,368,060 | B1 | 4/2002 | Fehrebach et al. | |
| 6,408,610 | B1 | 6/2002 | Caldwell et al. | |
| 6,547,524 | B2 | 4/2003 | Kohli et al. | |
| 6,573,474 | B1 | 6/2003 | Loringer | |
| 6,617,003 | B1 | 9/2003 | Lee et al. | |
| 6,781,091 | B2 | 8/2004 | Byrd et al. | |
| 6,890,668 | B2 | 5/2005 | Bruce et al. | |
| 6,908,657 | B2 | 6/2005 | Farmer et al. | |
| 7,216,485 | B2 | 5/2007 | Caldwell et al. | |
| 8,105,030 | B2 | 1/2012 | Abdel-Messeh et al. | |
| 8,733,111 | B2 | 5/2014 | Gleiner et al. | |
| 8,905,713 | B2 | 12/2014 | Bunker et al. | |
| 8,961,136 | B1 | 2/2015 | Liang | |
| 9,024,226 | B2 | 5/2015 | Levasseur et al. | |
| 9,181,809 | B2 | 11/2015 | Roberts, Jr. et al. | |
| 9,394,796 | B2 | 7/2016 | Lacy et al. | |
| 9,416,971 | B2 | 8/2016 | Xu | |
| 9,957,811 | B2 | 5/2018 | Hucker et al. | |
| 10,113,435 | B2 | 10/2018 | Pater | |
| 10,443,395 | B2 | 10/2019 | Webster | |
| 10,704,424 | B2 | 7/2020 | Burd et al. | |
| 2005/0220618 | A1 | 10/2005 | Zhang et al. | |
| 2006/0104807 | A1* | 5/2006 | Lee | F01D 5/186 415/115 |
| 2008/0085395 | A1 | 4/2008 | Feernihough et al. | |
| 2008/0095622 | A1 | 4/2008 | Naik et al. | |
| 2010/0143655 | A1 | 6/2010 | Rosenzweig et al. | |
| 2013/0206739 | A1 | 8/2013 | Reed et al. | |
| 2014/0208771 | A1* | 7/2014 | Koonankeil | F01D 5/186 60/722 |
| 2015/0377033 | A1* | 12/2015 | Xu | F23R 3/02 415/177 |
| 2016/0177733 | A1 | 6/2016 | Lewis et al. | |
| 2016/0273365 | A1 | 9/2016 | Slavens et al. | |
| 2017/0114646 | A1 | 4/2017 | Sreekanth et al. | |
| 2017/0152749 | A1 | 6/2017 | Bunker et al. | |
| 2017/0314399 | A1 | 11/2017 | Ahmad et al. | |
| 2018/0010484 | A1 | 1/2018 | Reed et al. | |
| 2018/0306114 | A1 | 10/2018 | Dudebout et al. | |
| 2019/0085705 | A1 | 3/2019 | Webster et al. | |
| 2019/0360107 | A1 | 11/2019 | Schruefer et al. | |
| 2020/0024951 | A1 | 1/2020 | Herman et al. | |
| 2020/0040743 | A1 | 2/2020 | Osgood et al. | |

* cited by examiner

GAS TURBINE ENGINES AND METHODS ASSOCIATED THEREWITH

CROSS-REFERENCE TO RELATED APPLICATIONS

This application is a continuation of U.S. patent application Ser. No. 18/104,371, filed Feb. 1, 2023, which is a continuation of U.S. patent application Ser. No. 16/987,872, filed Aug. 7, 2020, now U.S. Pat. No. 11,585,224, issued Feb. 21, 2023, all of which are incorporated herein by reference their entirety.

FIELD

The present subject matter relates generally to gas turbine engines, and more particularly to structures and methods associated with cooling various components of gas turbine engines.

BACKGROUND

Gas turbine engines include compressors in which engine air is pressurized. Gas turbine engines also include a combustor in which pressurized air is mixed with fuel to generate hot combustion gases. In typical designs (e.g., for aircraft engines or stationary power systems), energy is extracted from the gases in a high pressure turbine (HPT) which powers the compressor, and from a low pressure turbine (LTP). The low pressure turbine powers a fan in a turbofan aircraft engine application, or powers an external shaft for marine and industrial applications.

Many gas turbine engines utilize various cooling systems to accommodate relatively high temperatures therein. For example, certain engine components may be exposed to hot gases having temperatures up to about 3800° F. (2093° C.), for aircraft applications, and up to about 2700° F. (1482° C.), for the stationary power generation applications. To cool the components exposed to the hot gases, these "hot gas path" components may have both internal convection and external film cooling.

In the case of film cooling, a number of cooling holes may extend from a relatively cool surface of the component to a "hot" surface of the component. The cooling holes are usually cylindrical bores which are inclined at a shallow angle, through a wall of the component. Film cooling is an important mechanism for temperature control, since it decreases incident heat flux from hot gases to the surfaces of components. A number of techniques may be used to form the cooling holes; depending on various factors, e.g., the necessary depth and shape of the hole. Laser drilling, water jet cutting, and electro-discharge machining (EDM) are techniques frequently used for forming film cooling holes. The film cooling holes are typically arranged in rows of closely-spaced holes, which collectively may provide a large-area cooling blanket over the external surface.

The coolant air is typically compressed air that is bled off the compressor, which is then bypassed around the engine's combustion zone, and fed through the cooling holes to the hot surface. The coolant forms a protective "μm" between the hot component surface and the hot gas flow, thereby helping protect the component from heating. Furthermore, protective coatings, such as for example, thermal barrier coatings (TBCs), may be employed on the hot surface to increase the operating temperature of the components.

Various considerations are important in designing the most appropriate film cooling system. For example, a certain volume of air is usually required to flow over the hot surface of the component, and it may be beneficial for a significant portion of that air to stay attached to the hot surface, for as long as possible. Moreover, since a large number of film cooling holes require a larger amount of air to be bled off the engine compressor, engine efficiency may suffer if too many cooling holes are present. Furthermore, since future turbine engine designs may involve even higher operating temperatures, improved film cooling systems may take on even greater importance.

With these considerations in mind, new methods and structures for improving film coating cooling capabilities in gas turbine engines would be welcome in the art.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

DETAILED DESCRIPTION

Figure 1:
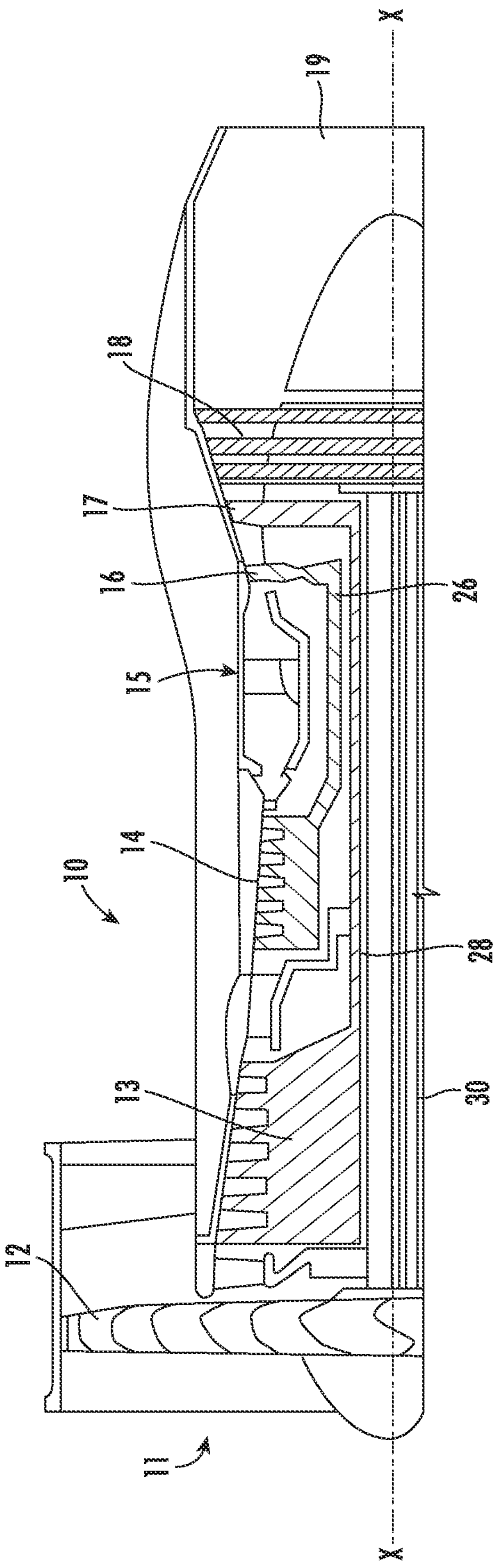
FIG. 1 is a partially cut away view of a gas turbine engine having a component with a cooling interface in accordance with an embodiment.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, affixing, or attaching, as well as indirect coupling, affixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In accordance with one or more embodiments described herein, a gas turbine engine can include a component, such as a turbine rotor blade, comprising a preform structure and a coating, such as a thermal barrier coating or an environmental barrier coating, disposed over the preform structure. The preform structure includes a plurality of cooling apertures, with at least some of the plurality of cooling apertures having differently contoured landings as compared to one another. By way of example, a first cooling aperture of the preform structure can define a first slope profile and a second cooling aperture of the preform structure can define a second slope profile different from the first slope profile. However, all of the cooling apertures of the resulting component (i.e., after application of the coating) can have the same slope profiles as compared to one another. In such a manner, the preform structure can be configured so as to compensate for non-homogenous application of coating material there along, such as may occur, for example, during certain directional coating methods and other application methods.

Any substrate which is exposed to high temperatures and requires cooling can be used for this invention to form the preform structure. Examples include ceramics or metal-based materials. Non-limiting examples of the metals or metal alloys which might form the preform structure include steel, aluminum, titanium: refractory metals such as molybdenum; and superalloys, such as those based on nickel, cobalt, or iron. The preform structure can also be formed of a composite material, such as a niobium silicide intermetallic composite.

A gas turbine engine 10, as shown in FIG. 1, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust. It should be understood that the components, assemblies, and methods described herein are not limited to gas turbine engines 10 as depicted in FIG. 1. In other embodiments, the gas turbine engine can include a different geometry, style, or design.

During the operation of a gas turbine engine, ambient air is pressurized by the fan mentioned above. A portion of the ambient air enters the compressor for additional pressurization, while the outer portion is discharged from a fan outlet for providing propulsion thrust in a turbofan engine application. The air pressurized in the compressor is mixed with fuel in the combustor for generating hot combustion gases. The combustion gases flow through the various turbine blade stages which extract energy therefrom for powering the compressor and fan during operation.

While a typical gas turbine engine like that described above may have a conventional configuration and operation, such an engine can be modified as described in accordance with one or more embodiments herein, to include improved cooling characteristics. Thus, one or more of the various engine components which are subject to heating from the hot combustion gases of the engine may be suitably cooled, for example, by bleeding a portion of the pressurized air from the compressor during operation, as mentioned previously, or through one or more other cooling options.

Figure 2:
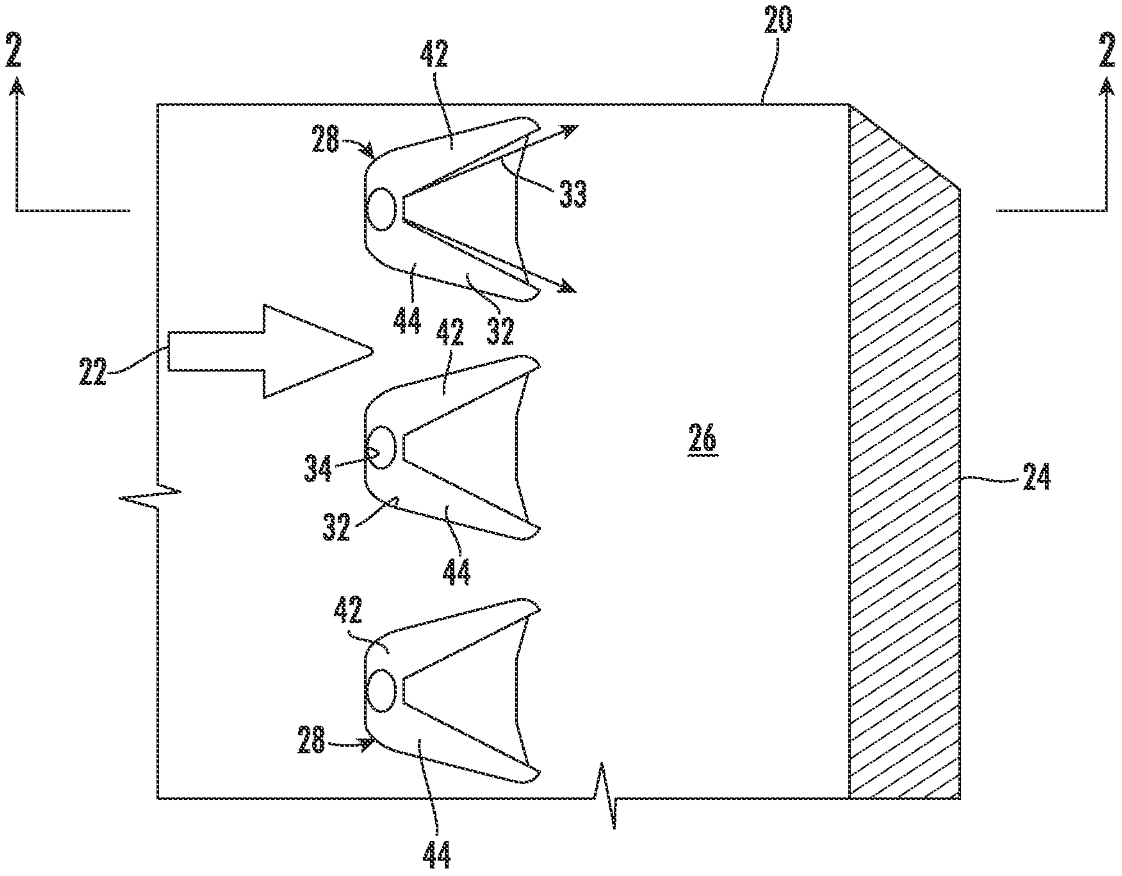
FIG. 2 is a perspective view of a portion of an outer surface of a preform structure of a component of a gas turbine engine in accordance with an embodiment.

These components usually include a preform structure 20 as depicted in FIG. 2. By way of example, the preform structure 20 can be formed from a superalloy like those mentioned above, since those materials exhibit high strength at elevated temperatures. A portion of the preform structure 20 is illustrated in plan view in FIG. 2; and a portion is also shown as a cross-section in FIG. 3. The thickness of the preform structure 20 will vary, depending on the component in which it is incorporated. In many instances, e.g., for many aviation components, the preform structure 20 has a thickness in the range of about 0.020 inch to about 0.150 inch (508 microns to about 3810 microns). For land-based components, the preform structure 20 often has a thickness in the range of about 0.050 inch to about 0.300 inch (1270 microns to about 7620 microns). These of course are only exemplary thicknesses, and in other embodiments, the preform structure 20 may have any other suitable thickness or configuration. For components like turbine rotor blades and the like, the preform structure 20 may be the underlying turbine rotor blade which is coated, for example, by a heat resistant coating.

The preform structure 20 includes opposite inner and outer wall surfaces 24, 26. The inner or inboard surface of the preform structure 20 may form the outer boundary of a suitable cooling circuit provided in the component which receives air bled from the compressor in any conventional manner. The outer surface 26 is exposed to the hot combustion gases 22 during operation (see FIG. 2) and requires suitable film cooling protection.

Figure 3:
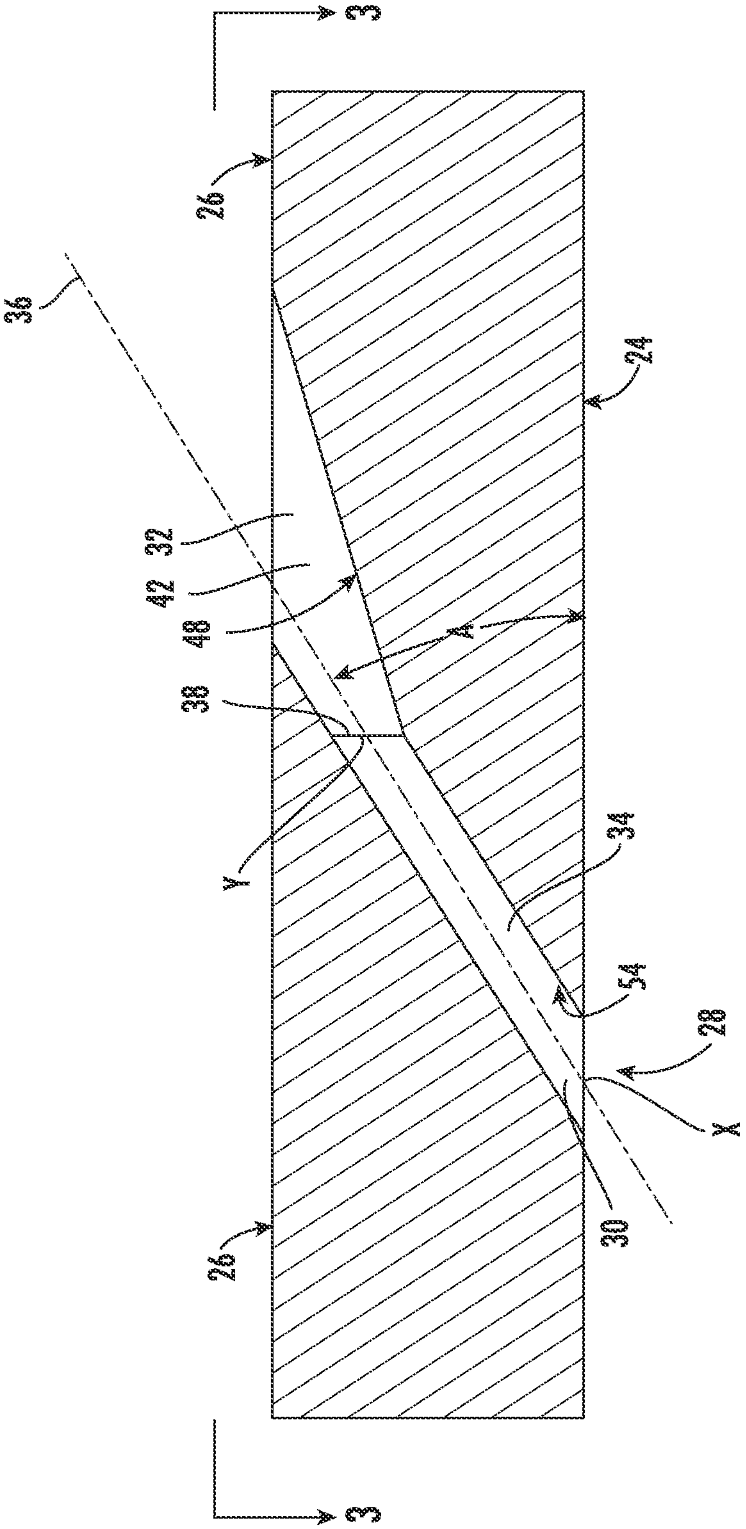
FIG. 3 is a transverse sectional view, taken along line 2-2 of FIG. 2, of one of the passage holes illustrated in FIG. 1 in accordance with an embodiment.

The exemplary component preform structure 20 illustrated in FIGS. 2 and 3 may be found in various components. They include the inner or outer combustor liners, turbine nozzle vanes, turbine nozzle bands, turbine rotor blades, the turbine shroud, or the exhaust liner. All of these components frequently incorporate various forms of film cooling holes or "passage holes" therein.

For embodiments of the present invention, passage holes 28 are arranged in a suitable row or other pattern (FIG. 2), along a selected span of the preform structure 20. In an embodiment, each passage hole 28 extends longitudinally through the preform structure 20, and diverges both longitudinally along the hole, and laterally across the width of the hole. Thus, each hole extends from an inlet 30 disposed flush at the inner surface 24 (see FIG. 3) to an outlet 32 disposed flush at the outer surface 26. As mentioned above, a portion of the pressurized air from the compressor is directed through the passage hole 28 (FIG. 2) as coolant air 33, exiting at the outlet 32.

In preferred embodiments, each of the passage holes 28 includes an inlet bore 34. The bore usually has a substantially constant flow area from its inlet end to its outlet end. As depicted in FIG. 3, the inlet bore has a longitudinal or axial centerline axis 36. The bore itself can be thought of as the portion of the passage hole which remains cylindrical or substantially cylindrical, i.e., prior to the beginning of the outlet. Thus, in FIG. 3, the inlet bore can be thought of as the section between points X and Y along axis 36. The upward termination site of the inlet bore can be referred to as "bore outlet" 38, which still lies below outer wall surface (exterior wall surface) 26. The inlet bore can be inclined at a relatively shallow angle "A", relative to its inner or outer surfaces, which are typically parallel with each other. The inclination angle A of the inlet bore is usually related to the typical inclination used for film cooling holes, e.g., about 20 degrees to about 45 degrees. In an embodiment, the passage holes 28 can lie along multi-linear pathways, arcuate pathways, or along a combination thereof.

Figure 4:
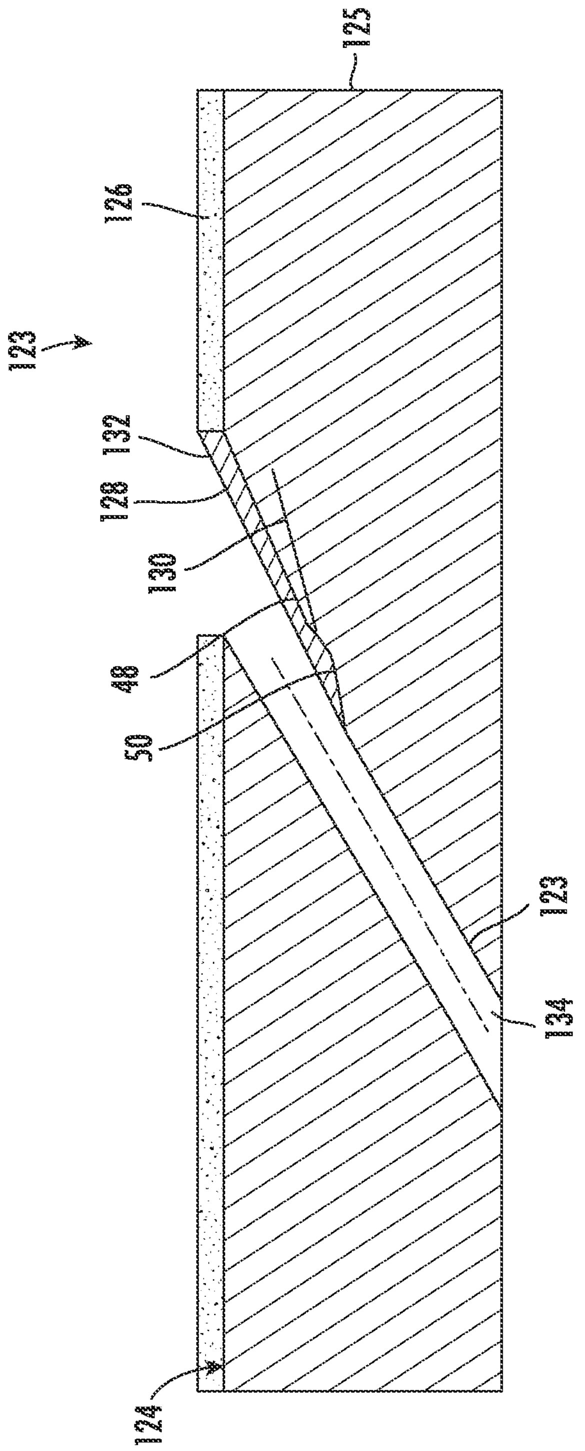
FIG. 4 is a transverse sectional view of a passage hole and exit site region, for a substrate covered by a coating, in accordance with an embodiment.

In an embodiment, the outlet 32 of the passage holes 28 can include a landing 48, or floor. The landing 48 can generally include a portion of the passage hole 28 that is angularly offset from the axial centerline axis 36. By way of example, the landing 48 can lie along a best fit line that is angularly offset from the axial centerline axis 36 by at least 1 degree, such as by at least 5 degrees, such as by at least 10 degrees. The landing 48 can extend to the outer surface 26. In the embodiment illustrated in FIG. 3, the landing 48 is depicted as a linear profile. In other embodiments, the landing 48 can have multiple linear segments coupled together at angular interfaces, one or more arcuate portions, or any combination thereof. In a particular embodiment illustrated in FIG. 4, the landing 48 includes a concave arcuate portion 50. The concave arcuate portion 50 can be disposed at any location along the landing. In a particular embodiment, the concave arcuate portion 50 is disposed at a location generally spaced apart from the outer surface 124. The concave arcuate portion 50 can be configured along a downstream side of the landing 48 designed to accept coating material. In certain embodiments, like as depicted in FIG. 4, the concave arcuate portion 50 can be at least partially disposed under a hood of the preform structure 124. In other embodiments, the concave arcuate portion 50, or a portion thereof, can be exposed from under the hood of the preform structure 124. In certain instances, the concave arcuate portion 50 can prevent over-depositing of coating past a prescribed depth of the passage hole 28.

The passage hole and outlet geometry described in embodiments of this invention can be obtained by using certain types of drilling, machining, and cutting techniques. Alternatively the preform structure 20 can be formed from additive manufacturing processes, such as three-dimensional printing.

As mentioned above, preform structures like those described herein are often covered by one or more coatings. Coatings which serve a number of purposes may be used. Frequently, coatings which provide thermal protection, and/or oxidation protection are applied. As one example, a component such as a gas turbine blade may be covered by a ceramic coating, e.g., a thermal barrier coating (TBC) formed of a zirconia material such as yttria-stabilized zirconia. In many cases for turbine blades, a bond layer is first applied over the blade surface, e.g., a metal-aluminide or MCrAlY material, where "M" can be iron, nickel, cobalt, or mixtures thereof.

FIG. 4 is a transverse sectional view of another passage hole 123, extending through the preform structure 125, according to some inventive embodiments. In this instance, the outer surface ("hot" surface) 124 of the preform structure 125 is covered by a protective coating system 126, which as described above, can constitute one or more individual coatings. The thickness of the protective coating can vary greatly (e.g., about 0.005 inch (127 microns) to about 0.050 inch (1270 microns), depending on various factors. In the case of a nickel superalloy-based turbine blade used in the "hot" section of a land-based gas turbine, protective coatings often have a thickness in the range of about 0.015 inch (381 microns) to about 0.045 inch (1143 microns), such as in the range of about 0.020 inch (500 microns) to about 0.035 inch (889 microns).

The passage hole 123 can be formed through the preform structure 125 by one of the techniques described below. The passage holes of the present invention can be formed successfully by several specialized techniques, using selected types of equipment. The techniques can include water jet cutting systems, electric discharge machining (EDM) systems, and laser-drilling systems. Each of these systems is described below. Moreover, in some cases, each of these techniques can be carried out by using the specific instrument in a single or repeated plunging motion, as also described below. (In this description, the EDM is said to involve treatment of the substrate with a "contacting device"; while water jet cutting systems and laser-drilling systems are said to involve treatment of the substrate with a "contacting medium", as further described below).

In an embodiment, the passage hole 123 can be formed at the formation level of the preform structure 125, such as, e.g., at the casting step. For instance, at the casting step of the preform structure 125 a negative of the hole shape can be formed and the preform structure 125 cast therearound. The negative of the hole shape can be formed using various methods, for example, including additive manufacturing. In another embodiment, the negative of the hole shape can be formed using another method such as, for example, machining with or without additive manufacturing.

In certain instances, application of one or more coatings along the preform structure may be performed in a way such that the preform structure receives a non-uniform coating. That is, for example, a coating thickness at a first location of the preform structure may be different from a coating thickness at a second location of the preform structure. This may be caused by the coating methodology itself. By way of example, application of the coating(s) may be performed using practices associated with directional coating methods where the coating is applied from a fixed, or semi-fixed, location relative to the preform structure and/or dispersed in a way so as to move laterally relative to the preform structure, thereby forming a non-uniform distribution pattern of the coating on the preform structure. As the coating material is released from a directional coating tool, such as a spray nozzle, the relative amount of coating deposited at any given location may be dependent upon one or more factors, such as the distance from the spray nozzle, geometry of neighboring areas of the preform structure, and the like. Areas of the preform structure disposed further away from the spray nozzle may receive less coating material as compared to areas closer to the spray nozzle. Similarly, areas of the preform structure disposed downstream of raised feature(s) may likewise receive reduced coating material as compared to areas disposed upstream of raised feature(s). The resulting component from such directional coating methods may exhibit unsatisfactory coating characteristics, e.g., sub-threshold material thicknesses, at certain locations as a result of its location.

To compensate for such variability, it is proposed to utilize a preform structure which accounts for anticipated variability encountered through using certain coating methodologies. The shape of features, e.g., passage holes, on the preform structure may be modified in view of non-uniform coating application methods such that the resulting component does not suffer from uneven coating deposition affects. Instead, the resulting component can exhibit desired characteristics as a result of improved design in view of coating directionality. Anticipated variability of the coating on the preform structure may be determined through one or more techniques, including, for example, trial and error, iterative processes, finite element analysis, computer modeling, and the like in view of the coating method and associated characteristics (e.g., spray speed, spray location, etc.). Once anticipated variability is determined, the determined variability can be utilized to shape, or update an existing shape, of the preform structure. In certain instances, coating of the shape, or updated shape, can be modeled to determine whether the resulting component will be correctly coated in view of the determined variability. Where further update is warranted, an additional update to the shape of the preform structure can be made. This process can be repeated as necessary until the anticipated variability and preform structure shape are matched such that the resulting component has the desired characteristics and shape, i.e., independent of the coating method used.

As described below, the resulting preform structure may exhibit various similar features having different characteristics based on their relative locations, orientations, and the like as measured with respect to the location of the coating nozzle. For example, features nearer to the spray nozzle may be deeper or larger so as to accept a greater amount of coating as compared to features disposed further away from the spray nozzle which receives a different spray intensity. Similarly, certain features of the preform structure may be offset from their desired orientation in view of spraying directionality such that the final outer layer of the coating is in a desirable position and orientation. The resulting component can thus meet minimum coating requirements while exhibiting correct size and shape of every portion and feature there along. This can improve the gas turbine engine through, for example, improved flow reductions, improved downstream film persistence, improved cooling performance, and the like.

Figure 5:
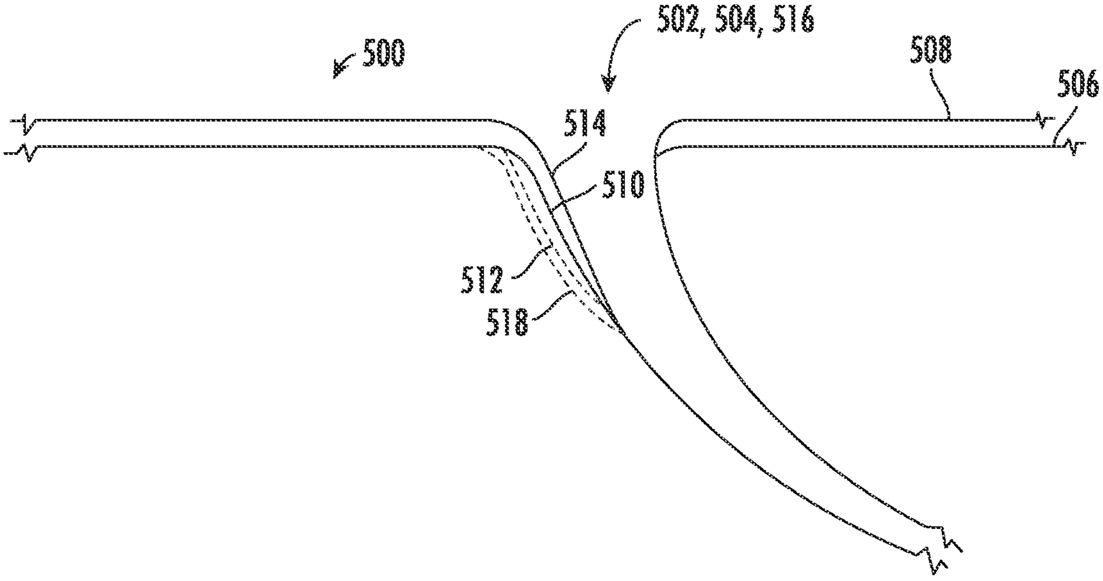
FIG. 5 is a simplified schematic view of first and second passage holes of the preform structure with a coating applied there along in accordance with an embodiment.

FIG. 5 is a simplified schematic view of a component 500 including a first passage hole 502 and a second passage hole 504 formed in a preform structure 506 with a coating 508 applied along the preform structure in accordance with an embodiment. The first and second passage holes 502 and 504 are illustrated transposed over one another as seen along a same relative planar dimension, e.g., a same relative plane. As illustrated, the first passage hole 502 includes a landing 510 having a first slope profile (as shown by a solid line) and the second passage hole 504 includes a landing 512 having a second slope profile (as shown by a dashed line) different from the first slope profile. The slope profiles generally relate to one or more characteristics of the profile (or shape) of the sloped landing. Exemplary characteristics include relative angle, relative depth, relative geometry, surface features, and the like.

Despite having different slope profiles, the first and second passage holes 502 and 504 share a common coating slope profile 514, as seen along a common plane. A third passage hole 516 is shown with a landing 518 having a third slope profile (illustrated by a dotted line) different from the first and second slope profiles. As shown, the second slope profile of the landing 512 is between the first and third slope profiles of the landings 510 and 518. In certain instances, the landing 512 can be disposed between the landings 510 and 518. More particularly, the second passage hole 504 can be located between the first passage hole 502 and the third passage hole 516. Subsequent passages holes, e.g., a fourth passage hole, a fifth passage hole, etc. can continue into the page, with at least some of the passage holes having yet further altered slope profiles.

The relative slope profiles of different passage holes, e.g., passage holes 502, 504, and 516, can account for varying angles, profile features (e.g., concave v. straight v. convex shapes), and the like. The relative slope profiles should be construed as accounting for a variable attribute of the passage holes which does not remain constant between all passage holes.

In an embodiment, the slope profiles of the passage holes can have different scale factors. As used herein, “scale factor” refers to a relative size, shape, and/or geometry of the passage holes and/or landings thereof as compared to one another. Scale factors may define relative cross-sectional profiles of the passage holes and/or landings as they relate to one another. By way of example, the first cooling hole 502 can have an entry angle of 20° defining a scale factor of 0.5 as compared to the second cooling hole 504 having an entry angle of 40°. By way of another example, the first cooling hole 502 with an entry angle of 20° and a first scale factor and the third cooling hole 516 with an entry angle of 60° and a third scale factor may be interposed by the second cooling hole 504 with an entry angle of 40° and a second scale factor between the first and third scale factors. The scale factor, in certain exemplary embodiments may refer to a ratio of length to width at a defined depth of the cooling hole (i.e., the same depth for each of the cooling holes compared).

Figure 6:
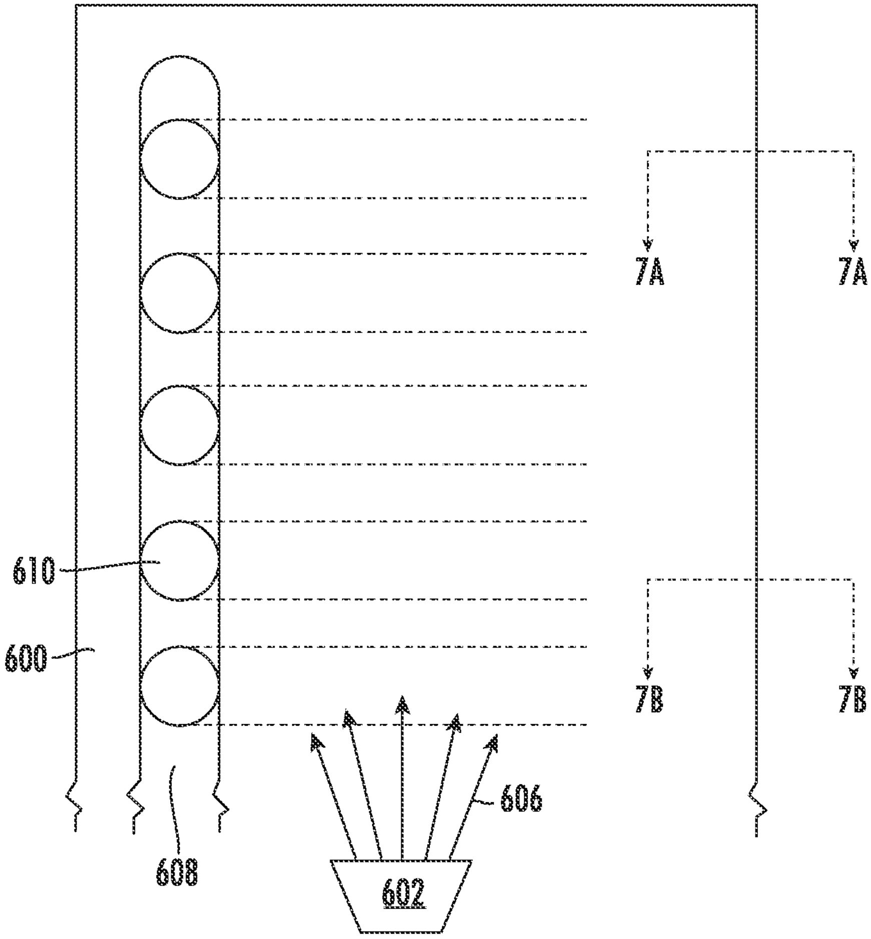
FIG. 6 is a simplified plan view of a method of applying the coating to the preform structure in accordance with an embodiment.
Figure 7A:
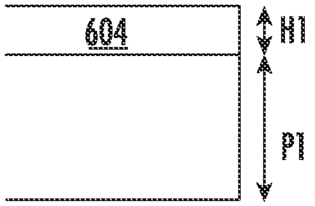
FIG. 7A is a transverse sectional view, taken along line 7A-7A of FIG. 6, of a component including a preform structure and a coating in accordance with an embodiment.

FIG. 6 illustrates is a simplified schematic view of a setup for applying the coating to the preform structure in accordance with an embodiment. The embodiment depicted in FIG. 6 is illustrative only and not intended to limit the arrangement of any components, processes, directional/spatial arrangements, or the like to the illustrated embodiment. The set up illustrates a preform structure 600 disposed within a fluid path of a directional applicator 602 configured to apply a coating 604 (FIGS. 7A and 7B) onto the preform structure 600. As illustrated, the directional applicator 602 applies the coating by projecting the coating directionally onto the preform 600 along arrowed lines 606. As coating is applied, dispersion patterns will emerge, e.g., as a result of non-uniformly propelled coating materials and other naturally and artificially affected variables. By way of example, the dispersion pattern may have a radiating fan shape with higher concentrations of coating along the centerline of the dispersion pattern. As a result, the coating is not applied uniformly across the entire surface of the preform structure. For instance. FIG. 7A illustrates a cross-sectional view of the preform structure 600 and coating 604 along line 7A-7A in FIG. 6, while FIG. 7B illustrates a similar-cross sectional view of the preform structure 600 and 604 as seen along line 7B-7B in FIG. 6.

Heights of the coating at cross-sectional lines 7A-7A and 7B-7B are noticeably different. The height, $H_1$, of the coating 604 at a further distance removed from the directional applicator 602 is less than a height, $H_2$, of the coating 604 as measured at a nearer position relative to the directional applicator 602. To adjust for this difference, the heights, $P_1$ and $P_2$, of the underlying portion of the preform structure 600 can be made different from one another.

Similarly, a shared trench 608 from which the passage holes 610 exit the preform structure 600 can be shaped, sized, and/or oriented to correct for the effects created by the dispersion pattern. For example, the longitudinal axis of the shared trench 608 of the preform structure 600 may be angularly offset from the longitudinal axis of the shared trench 608 of the resulting component. In another embodiment, the shared trench 608 can have a non-constant width. For example, the shared trench 608 can taper from a larger width to a smaller width. In yet another embodiment, the depth of the shared trench 608 may change, as measured along the length of the shared trench 608. In certain instances, the changing dimensions or characteristics can change at constant rates of change. In other instances, however, the changing dimension(s) or characteristic(s) can change at non-constant rates of change so as to best adapt to the dispersion pattern.

Figure 7B:
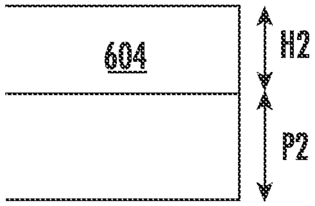
FIG. 7B is a transverse sectional view, taken along line 7B-7B of FIG. 6, of a component including a preform structure and a coating in accordance with an embodiment.

Referring again to FIG. 5, relative adjustment to the preform structure 506 at the passage holes, made using an adjustment technique similar to that described above with respect to the surface height of the coating shown in FIGS. 6 to 7B, can create uniformity between holes on the completed component. That is, proper part construction can occur by intentionally offsetting characteristics of the underlying (substrate) preform structure 506.

Figure 8:
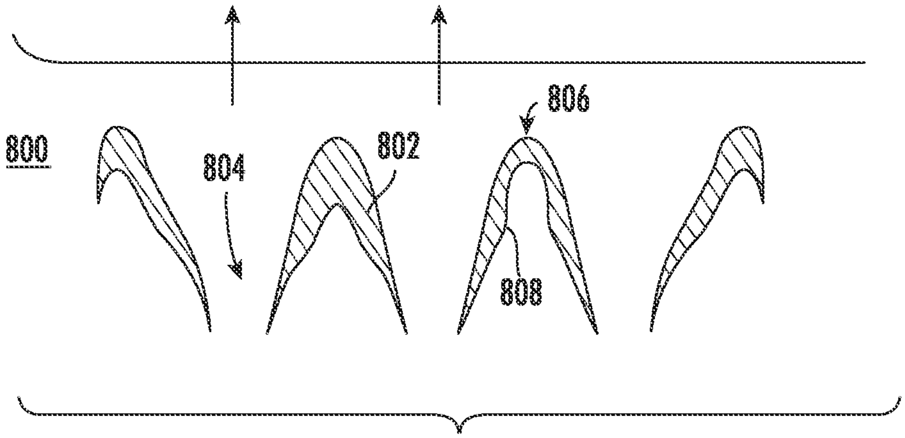
FIG. 8 is a view of cooling hole divisions located between adjacent passage holes of the component in accordance with an embodiment.

FIG. 8 illustrates a view of the sides of cooling hole divisions 802 that are disposed between adjacent passage holes 804. While the outermost surface 806 of the cooling hole divisions 802 share a common relative shape, size, or both, the underlying surfaces 808 of the preform structure 800 are different for each cooling hole division 802. In such a manner, the underlying surfaces 808 are intentionally offset from the desired component to be created to compensate for the dispersion pattern.

Figure 9:
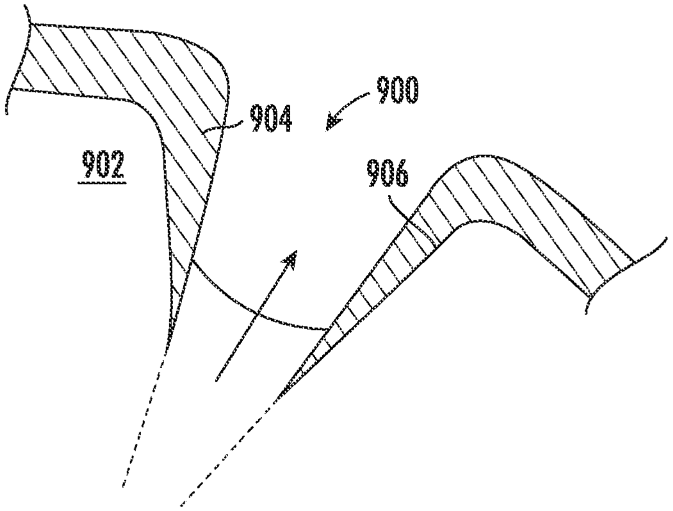
FIG. 9 is a transverse sectional view of passage holes in accordance with an embodiment.

FIG. 9 illustrates a transverse, cross-sectional view of another passage hole 900 extending into a preform structure 902. The preform structure 902 includes landings 904 and 906 which are shaped independently of one another, and independently of other passage hole landings, based on the specific arrangement, e.g., distance, angle, relative depth, etc., of those landings 904 and 906 relative to the directional applicator.

Figure 10:
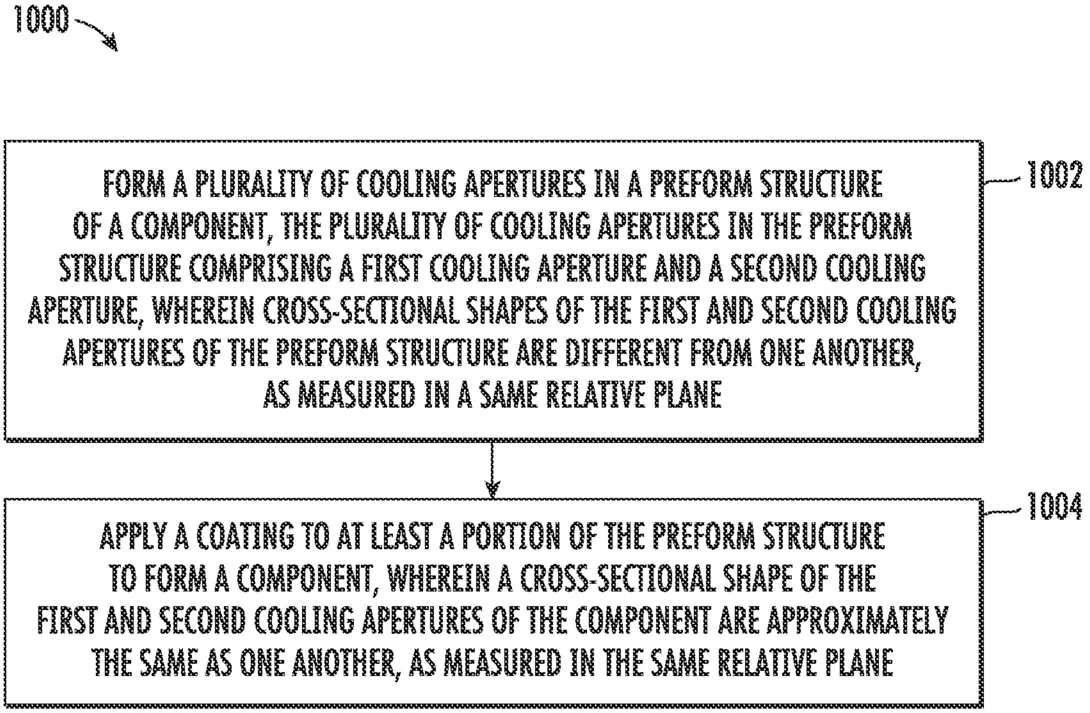
FIG. 10 is a flow chart of a method of forming a gas turbine engine component in accordance with an embodiment.

FIG. 10 illustrates a method 1000 of forming a component of a gas turbine engine. The method 1000 includes a step 1002 of forming a plurality of cooling apertures in a preform structure of the component. The plurality of cooling apertures in the preform structure can comprise a first cooling aperture and a second cooling aperture. Cross-sectional shapes of the first and second cooling apertures of the preform structure can be different from one another, as measured in a same relative plane. That is, for example, when overlaying the plurality of cooling apertures over one another (e.g., as shown in FIG. 5), the shapes and/or sizes of the first and second cooling apertures can be different from one another. The method 1000 can further include a step 1004 of applying a coating to at least a portion of the preform structure to form the component. A cross-sectional shape of the first and second cooling apertures of the component, i.e., after application of the coating, can be approximately the same as one another, as measured in the same relative plane. That is, the step 1004 of applying the coating to the preform structure can occur in a manner such that the differences between the cooling apertures observed after step 1002 do not exist, or substantially do not exist, in the final component.

Components formed in accordance with embodiments described herein can provide improved cooling effectiveness through flow reductions and durability improvements created through better coating formations. Improved downstream coating persistence can be achieved by properly compensating for coating effects. Accordingly, gas turbine engines can be run more efficiently and potentially generate increased power output.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Embodiment 1. A method of forming a gas turbine engine component, the method comprising: forming a plurality of cooling apertures in a preform structure of the component, the plurality of cooling apertures of the preform structure comprising a first cooling aperture and a second cooling aperture, wherein cross-sectional shapes of the first and second cooling apertures of the preform structure are different from one another, as measured in a same relative plane; and applying a coating to at least a portion of the preform structure to form the component, wherein a cross-sectional shape of the first and second cooling apertures of the component are approximately the same as one another, as measured in the same relative plane.

Embodiment 2. The method of any one or more of the embodiments, wherein the first and second cooling apertures exit the preform structure along a shared trench and enter the preform structure at individual locations, and wherein applying the coating is performed at the shared trench.

Embodiment 3. The method of any one or more of the embodiments, wherein forming the gas turbine engine comprises forming a gas turbine rotor blade.

Embodiment 4. The method of any one or more of the embodiments, wherein the forming the first cooling aperture comprises forming a sloped landing for receiving the coating, the sloped landing of the preform structure defining a first slope profile along a length of the aperture, wherein applying the coating is performed such that the first aperture of the component defines a second slope profile along the length of the aperture, and wherein the first and second slope profiles are different from one another.

Embodiment 5. The method of any one or more of the embodiments, wherein applying the coating is performed by plasma deposition or a directional coating method.

Embodiment 6. The method of any one or more of the embodiments, wherein directional coating is performed in a direction within a range between 25 degrees and 90 degrees with respect to the relative plane.

Embodiment 7. The method of any one or more of the embodiments, wherein forming the plurality of cooling apertures in the preform structure is performed by an additive manufacturing process.

Embodiment 8. The method of any one or more of the embodiments, wherein applying the coating is performed with a coating comprising at least one of a thermal barrier coating (TBC), a bond coating, and an environmental barrier coating.

Embodiment 9. A preform structure of a gas turbine engine component, the preform structure comprising: a plurality of cooling apertures in the preform structure, the plurality of cooling apertures comprising: a first cooling aperture extending through the preform structure from a first opening having a first cross-sectional scale factor; a second cooling aperture extending through the preform structure from a second opening having a second cross-sectional scale factor; and a third cooling aperture extending through the preform structure from a third opening having a third cross-sectional scale factor, wherein the first, second, and third openings lie along a line, wherein the second opening is disposed substantially equidistant between the first and third openings, and wherein the second scale factor is between the first and third scale factors.

Embodiment 10. The preform structure of any one or more of the embodiments, wherein the second scale factor is equally different from the first scale factor as the third scale factor.

Embodiment 11. The preform structure of any one or more of the embodiments, wherein the first, second, and third cooling apertures exit the preform structure along a shared trench.

Embodiment 12. The preform structure of any one or more of the embodiments, wherein the preform structure comprises a preform of a gas turbine engine rotor blade.

Embodiment 13. The preform structure of any one or more of the embodiments, wherein the first cooling aperture comprises a first sloped landing, wherein the second cooling aperture comprises a second sloped landing, wherein the third cooling aperture comprises a third sloped landing, and wherein the first, second, and third sloped landings are different from one another.

Embodiment 14. The preform structure of any one or more of the embodiments, wherein at least one of the first, second, and third cooling apertures includes a sloped landing for receiving a coating, the sloped landing defining a nonuniform slope along a length of the aperture.

Embodiment 15. A gas turbine engine component comprising: a preform structure defining a plurality of cooling apertures, the plurality of cooling apertures including a first cooling aperture; and a coating disposed over at least a portion of the preform structure; wherein the first cooling aperture includes a sloped landing for receiving the coating, the sloped landing defining a first slope profile along a length of the aperture, wherein the coating is disposed over the sloped landing and defines a second slope profile along the length of the aperture, and wherein the first and second slope profiles are different from one another.

Embodiment 16. The gas turbine engine component of any one or more of the embodiments, wherein the preform structure further comprises a second cooling aperture, wherein the first and second cooling apertures exit the preform structure at a shared trench and enter the preform structure at individual locations, and wherein the cross-sectional shape of the first and second cooling apertures are different from one another, as measured in a same plane.

Embodiment 17. The gas turbine engine component of any one or more of the embodiments, wherein a shape of an outer surface of the coating at the first cooling aperture is approximately the same as a shape of the outer surface of the coating at the second cooling aperture, as measured in the same plane.

Embodiment 18. The gas turbine engine component of any one or more of the embodiments, wherein the coating comprises at least one of a thermal barrier coating (TBC), a bond coating, and an environmental barrier coating.

Embodiment 19. The gas turbine engine component of any one or more of the embodiments, wherein the gas turbine engine component comprises a gas turbine engine rotor blade.

Embodiment 20. The gas turbine engine component of any one or more of the embodiments, wherein the coating has an uneven thickness, and wherein the uneven thickness corresponds with a dispersion pattern used in applying the coating.

What is claimed is:

1. A gas turbine engine component comprising:

a preform structure defining a plurality of cooling apertures, the plurality of cooling apertures including a first cooling aperture and a second cooling aperture; and a coating disposed over at least a portion of the preform structure;

wherein the first cooling aperture includes a first portion having a first slope profile and wherein the second cooling aperture includes a second portion having a second slope profile such that the first slope profile is different from the second slope profile with respect to a reference plane, and wherein the coating is disposed over the first portion and the second portion such that the first portion and the second portion have a same coating slope profile with respect to the reference plane.

2. The gas turbine engine component of claim 1, wherein the first slope profile differs from the second slope profile in at least one of: relative angle, relative depth, relative geometry, relative size, height, distance, angle, entry angle, scale factor, ratio of length to width at a defined depth, or surface features.

3. The gas turbine engine component of claim 1, wherein the coating creates uniformity of the first cooling aperture and the second cooling aperture.

4. The gas turbine engine component of claim 1, wherein the coating comprises at least one of a thermal barrier coating (TBC), a bond coating, and an environmental barrier coating.

5. The gas turbine engine component of claim 1, wherein the gas turbine engine component comprises a portion of a blade.

6. The gas turbine engine component of claim 1, wherein the first slope profile is a first height characteristic and the second slope profile is a second height.

7. The gas turbine engine component of claim 6, wherein the coating has an uneven thickness, and wherein the uneven thickness corresponds with a dispersion pattern used in applying the coating.

8. The gas turbine engine component of claim 1, wherein the preform structure is an additively manufactured preform structure.

9. The gas turbine engine component of claim 1, wherein the coating has an uneven thickness.

10. The gas turbine engine component of claim 1, wherein the first slope profile is an underlying surface of the preform structure for the first cooling aperture and second slope profile is an underlying surface of the preform structure for the second cooling aperture.

11. The gas turbine engine component of claim 1, wherein the coating is a plasma deposition coating or a direction coating.

12. The gas turbine engine component of claim 11, wherein directional coating is performed in a direction within a range between 25 degrees and 90 degrees with respect to a relative plane.

13. A gas turbine engine component comprising:

a preform structure defining a plurality of cooling apertures, the plurality of cooling apertures including a first cooling aperture and a second cooling aperture, the preform structure for the first cooling aperture having a first slope profile and the preform structure for the second cooling aperture having a second slope profile, the first slope profile different from the second slope profile in a reference plane; and a coating disposed over at least a portion of the preform structure, wherein the coating forms a same cooling slope profile in the reference plane for both the first cooling aperture and the second cooling aperture.

14. The gas turbine engine component of claim 13, wherein the coating forms a first outermost surface of the preform structure for the first cooling aperture and a second outermost surface of the preform structure for the second cooling aperture, and wherein the same cooling slope profile shares at least one of a common relative shape or size.

15. The gas turbine engine component of claim 13, wherein the first slope profile forms a first underlying surface of the preform structure for the first cooling aperture and the second slope profile forms a second underlying surface of the preform structure for the second cooling aperture.

16. The gas turbine engine component of claim 15, wherein the first underlying surface of the preform structure for the first cooling aperture and the second underlying surface of the preform structure for the second cooling aperture are offset to compensate for a dispersion pattern used in applying the coating.

17. The gas turbine engine component of claim 15, wherein the first underlying surface of the preform structure for the first cooling aperture differs from the second underlying surface of the preform structure for the second cooling aperture in at least one of distance, angle, relative depth, entry angle, scale factor, profile features, ratio of length to width at a defined depth, or a combination thereof.

18. The gas turbine engine component of claim 13 wherein the preform structure is configured to accommodate for at least one of a spray intensity, a spray direction, minimum coating requirements.

19. The gas turbine engine component of claim 13, wherein the gas turbine engine component comprises a portion of a blade.

20. The gas turbine engine component of claim 13, wherein a cooling hole division is disposed between adjacent of the plurality of cooling apertures and an underlying surface of the preform structure for a first cooling hole division is different from an underlying surface of the preform structure for a second cooling hole division.

* * * * *